(12) United States Patent  
Yamanaka et al.

(10) Patent No.: US 7,258,041 B2
(45) Date of Patent: Aug. 21, 2007

(54) BICYCLE CRANK ASSEMBLY (75) Inventors: Masahiro Yamanaka, Izumisano (JP); Yoko Terasawa, Sakai (JP); Sota Hamada, Sakai (JP); Takahiro Nakano, Sennan (JP); Yoshiyuki Yoshida, Nishinomiya (JP); Takashi Ishihara, Habikino (JP); Toshiaki Tatsumi, Kashiba (JP)

(73) Assignee: Shimano Inc., Osaka (JP)

( * ) Notice: Subject to any disclaimer, the term of this patent is extended or adjusted under 35 U.S.C. 154(b) by 586 days.

(21) Appl. No.: 10/773,243

(22) Filed: Feb. 9, 2004

(65) Prior Publication Data  
US 2004/0162172 A1  Aug. 19, 2004

(30) Foreign Application Priority Data  
Feb. 18, 2003  (JP) .............................. 2003-040233

(51) Int. Cl.  
G05G 1/14  (2006.01)

(52) U.S. Cl. ..................................... 74/594.2

(58) Field of Classification Search ............... 74/594.1, 74/594.2; 474/160; 384/489, 485  
See application file for complete search history.

(56) References Cited  
U.S. PATENT DOCUMENTS  
4,300,411 A * 11/1981 Segawa ..................... 74/594.2

5,480,359 A  1/1996  Tani
5,988,016 A  11/1999  Yamanaka

FOREIGN PATENT DOCUMENTS

| EP | 1 059 123 A2 | 12/2000 |
|---|---|---|
| JP | 51-6653 | 1/1976 |
| JP | 51-6654 | 1/1976 |
| JP | 51-007855 U | 1/1976 |
| JP | 51-7856 | 1/1976 |
| JP | 53-1708 | 1/1978 |

* cited by examiner

Primary Examiner—Vicky A. Johnson  
(74) Attorney, Agent, or Firm—Global IP Counselors, LLP (57) ABSTRACT A bicycle crank assembly has a right crank crimp-fastened to a crank shaft in such a manner that the external appearance is attractive. The crank shaft has a first and second portions with the second portion being positioned on the right side of the first portion and having a larger diameter than the first portion. The right crank has a sprocket mounting part, a right crank arm part, and an engagement bore formed in the center of the sprocket mounting part. The right crank is crimp-fastened to the crank shaft by installing the second portion of the crank shaft into the engagement bore and pressing the periphery of the engagement bore toward the outside in the axial direction of the crank shaft such that the pressed portion bulges radially inward and an annular space is formed between the crank shaft and the engagement bore.

20 Claims, 11 Drawing Sheets

BICYCLE CRANK ASSEMBLY

BACKGROUND OF THE INVENTION

1. Field of the Invention

The present invention relates to a bicycle crank assembly. More particularly, the present invention relates to a bicycle crank assembly that can be mounted to a hanger of a bicycle frame.

2. Background Information

The crank of a bicycle is mounted to a crank shaft that is mounted in a freely rotatable-manner to a bottom hanger of the bicycle frame. Crank assemblies in which the right crank is fastened to the crank shaft by crimping have been known for some time (see, for example, Examined Japanese Utility Model Application Publication No. 53-1708). As used herein, the terms "left" and "right" are used to described bicycle components on the assumption that the bicycle is viewed from the rear.

In conventional crank assemblies in which the right crank is fastened to the crank shaft by crimping, the crank shaft is provided with a portion having a different diameter, such as an annular groove or protrusion, and the end part of the right crank is provided with a press-fitting hole and crimping material around the edge of the press-fitting hole. The press-fitting hole is formed such that its depth is larger than the diameter of the end part of the right crank. The right crank is crimp-fastened to the crank shaft by pressing the entire end-edge of the crimping material toward the different-diameter portion, i.e., toward the outside, in the axial direction such that the crimping material bulges radially inward around the different-diameter portion. Simultaneously, as the crimping material bulges, its radially outward-facing surface crimp-fastens the sprocket.

In view of the above, it will be apparent to those skilled in the art from this disclosure that there exists a need for an improved bicycle crank assembly. This invention addresses this need in the art as well as other needs, which will become apparent to those skilled in the art from this disclosure.

SUMMARY OF THE INVENTION

In the conventional arrangement just described, the crank shaft is formed with a different-diameter portion and the right crank is crimp-fastened to the crank shaft by pressing the crimping material toward the different-diameter portion, i.e., toward the outside, in the axial direction such that the crimping material bulges radially inward around the different-diameter portion. Consequently, uneven surfaces are formed on the end-edge and radially outward-facing surface of the crimping material during crimping and there is the possibility that the external appearance will be degraded.

Furthermore, with the conventional arrangement just described, the length of the right crank in the axial direction of the crank shaft is long because the depth of the press-fitting hole is larger than the diameter of the crank shaft. Consequently, the right crank easily touches against the heel of the rider during pedaling and there is the possibility that the right crank will become an impediment during pedaling.

The object of the present invention is to provide a bicycle crank assembly in which the right crank can be crimp-fastened to the crank shaft in such a manner that the external appearance is attractive.

Another object of the present invention is to prevent the crank from being an impediment during pedaling.

A bicycle crank assembly in accordance with a first aspect of the present invention is provided that can be mounted to a hanger of a bicycle frame and is provided with a crank shaft and a right crank. The crank shaft has a first portion and a second portion with the second portion being positioned on the right side of the first portion and having a larger diameter than the first portion. The right crank is provided with a sprocket mounting part having a plurality of arm parts configured and arranged to support at least one sprocket, a crank arm part formed integrally with the sprocket mounting part and extending in a radial direction from a first surface of the sprocket mounting part, and a crank shaft engagement bore formed in a center of a second surface located on an opposite side of the sprocket mounting part as the first surface. The right crank is crimp-fastened to the crank shaft by installing the second portion of the crank shaft into the engagement bore such that a gap is formed between the first portion and the engagement bore, and pressing the periphery of the engagement bore from the second surface toward the first surface in the axial direction of the crank shaft such that a pressed portion bulges radially inward and an annular space is formed between the crank shaft and the engagement bore.

With this crank assembly, the crank shaft is provided with a first portion and a larger-diameter second portion and the right crank is crimp-fastened to the second portion. When the right crank is crimp-fastened, the second portion of the crank shaft is installed into the engagement bore such that a gap can be formed between the first portion and the engagement bore and then the periphery of the engagement bore is pressed toward the outside in the axial direction of the crank shaft such that the pressed portion bulges radially inward, thus crimp-fastening the right crank and forming an annular space between the crank shaft and the engagement bore. By crimp-fastening the right crank to the crank shaft in this manner, radially outward bulging is eliminated and the same external appearance as before crimp-fastening can be maintained. Therefore, the right crank can be crimp-fastened to the crank shaft in such a manner that the external appearance is attractive.

In accordance with a second aspect of the present invention, the bicycle crank assembly of the first aspect of the present invention is configured such that the annular space defines an end face that is recessed from the second surface toward the first surface. With this bicycle crank assembly, the crimped portion is not exposed at the second surface because the end face of the annular space obtained when the pressed portion bulges toward the gap between the first portion and the right crank is depressed.

In accordance with a third aspect of the present invention, the bicycle crank assembly of the first or second aspects of the present invention is configured such that a seal member is provided between a radially inward-facing surface of the annular space and a radially outward-facing surface of the first portion. With this bicycle crank assembly, the seal prevents liquids, dust, and other contaminants from entering the gap between the crank shaft and the second portion.

In accordance with a fourth aspect of the present invention, the bicycle crank assembly of any one of the first through third aspects of the present invention is configured such that the engagement bore has an axial length that is shorter than the diameter of the second portion. With this bicycle crank assembly, the thickness of the right crank (which is crimp-fastened to the crank shaft) can be reduced to obtain a crank having a low profile because the length of the engagement bore of the right crank is shorter than the diameter of the second portion of the crank shaft. Consequently, the heel of the rider is less likely to touch against the crank during pedaling and the crank is less likely to become an impediment during pedaling.

A bicycle crank assembly in accordance with a fifth aspect of the present invention is provided to be mounted to a hanger of a bicycle frame and is provided with a crank shaft and a crank. The crank shaft has a first portion and a second portion with the second portion being positioned closely adjacent to the first portion and having a larger diameter than the first portion. The crank has a pedal mounting part provided on the tip end thereof and an engagement bore formed in the base end thereof. The engagement bore is crimp-fastened to the second portion of the crank shaft. With this crank assembly, the crank shaft is provided with a first portion and a larger-diameter second portion and an engagement bore that is shorter than the diameter of the second portion is crimp-fastened to the second portion. Since the length of the engagement bore of the crank (which is crimp-fastened to the crank shaft) is shorter than the diameter of the second portion of the crank shaft, the thickness of the crank can be reduced to obtain a crank having a low profile. Consequently, the heel of the rider is less likely to touch against the crank during pedaling and the crank is less likely to become an impediment during pedaling.

In accordance with a sixth aspect of the present invention, the bicycle crank assembly of the fifth aspect of the present invention is configured such that the crank is a right crank provided with a sprocket mounting part having a plurality of arms configured to support one or more sprockets, and a crank arm part formed integrally with the sprocket mounting part and extending in a radial direction from a first surface of the sprocket mounting part. The engagement bore is formed in the center of a second surface located on the opposite side of the sprocket mounting part as the first surface. With this bicycle crank assembly, the right crank is provided with a sprocket mounting part and a crank arm part and can be made with a low profile (right cranks tend to have a larger axial dimension than left cranks). Consequently, the heel of the rider is less likely to touch against the right crank during pedaling and the right crank is less likely to become an impediment during pedaling.

In accordance with a seventh aspect of the present invention, the bicycle crank assembly of the fifth or sixth aspect of the present invention is configured such that the crank is crimp-fastened by installing the second portion of the crank shaft into the engagement bore such that a gap can be formed between the first portion and the engagement bore, and pressing a periphery of the engagement bore toward the outside in the axial direction of the crank shaft such that the pressed portion bulges radially inward. With this crank shaft assembly, the crank is crimp-fastened by installing the second portion of the crank shaft into the engagement bore such that a gap can be formed between the first portion and the engagement bore and then pressing the periphery of the engagement bore toward the outside in the axial direction such that the pressed portion bulges radially inward. By crimp-fastening the crank to the crank shaft in this manner, radially outward bulging is eliminated and the same external appearance as before crimp-fastening can be maintained. Therefore, the crank can be crimp-fastened to the crank shaft in such a manner that the external appearance is attractive.

In accordance with an eighth aspect of the present invention, the bicycle crank assembly of any one of the first through seventh aspects of the present invention is configured such that the crank shaft includes a hollow portion located where the right crank is mounted, and the crank shaft is configured and arranged to be supported in a freely rotatable manner at both axially-facing ends of a hanger by bearing assemblies installed in the hanger. With this bicycle crank assembly, the crank shaft has a hollow structure at least along the portion where the right crank is mounted and is supported in a freely rotatable manner at both axially-facing ends of the hanger. As a result, the diameter of the crank shaft can be enlarged and the assembly can be made lighter in weight while maintaining its strength. Furthermore, a high crimp strength can be maintained even if the length of the engagement bore is smaller than the diameter of the second portion because the diameter of the crimp-fastened portion is larger.

In accordance with a ninth aspect of the present invention, the bicycle crank assembly of the eighth aspect of the present invention is configured such that the hollow portion of the crank shaft extends an entire length of the crank shaft. With this bicycle crank assembly, the weight can be reduced even further while maintaining strength.

In accordance with a tenth aspect of the present invention, the bicycle crank assembly of any one of the first through ninth aspects of the present invention is configured such that a radially outward-facing surface of the second portion is provided with a plurality of first undulations that are spaced in a circumferential direction of the crank shaft; and the engagement bore has a plurality of second undulations spaced in the circumferential direction of the engagement bore. The first and second undulations are mesh in such a manner that the crank cannot rotate relative to the crank shaft. With this bicycle crank assembly, the right crank can be fastened at a prescribed rotational angle with respect to the crank shaft by means of the meshing of serrations or other undulations.

In accordance with an eleventh aspect of the present invention, the bicycle crank assembly of the tenth aspect of the present invention is configured such that the first undulations and second undulations each include positioning undulations in two different circumferential spaced locations. With this bicycle crank assembly, since positioning undulations provided in two locations are used to position the right crank, the positioning undulations serve as a reference when the crank is attached and if, for example, the crank is manufactured by cold forging, the balance will be good during cold forging (because there are positioning undulations in two locations) and the dies will last a long time.

In accordance with a twelfth aspect of the present invention, the bicycle crank assembly of any one of the first through eleventh aspects of the present invention is configured such that the second portion of the crank shaft is formed to have a first length in the axial direction; and the engagement bore is formed to have a second length that is longer than the first length and extends almost to the first surface. With this bicycle crank assembly, since the engaging depression of the right crank does not pass all the way through to the first surface, a depression for fastening to the crank shaft is not exposed at the first surface. Thus, the first surface side of the right crank has a more attractive appearance and the aesthetic design freedom is improved.

In accordance with a thirteenth aspect of the present invention, the bicycle crank assembly of the twelfth aspects of the present invention is configured such that the engagement bore is a blind bore such that a hole for mounting the crank shaft is not provided in the first surface of the sprocket mounting part. With this bicycle crank assembly, since a hole is not formed in the first surface, an external appearance having a high-end feel can be obtained and the aesthetic design freedom is improved even further.

In accordance with a fourteenth aspect of the present invention, the bicycle crank assembly of any one of the first through eleventh aspects of the present invention is configured such that the second portion of the crank shaft has a first length in the axial direction; and the engagement bore has a second length that is longer than the first length and passes through the first surface. With this bicycle crank assembly, the weight of the assembly can be reduced more readily because an opening is formed in the first surface.

In accordance with a fifteenth aspect of the present invention, the bicycle crank assembly of the fourteenth aspect of the present invention is configured such that a lid member covers the opening formed in the first surface. With this bicycle crank assembly, covering the opening with a lid member improves the aesthetic design freedom and helps prevent contaminants from reaching the inside of the assembly even when the crank shaft has a hollow structure.

In accordance with a sixteenth aspect of the present invention, the bicycle crank assembly of any one of the first through fifteenth aspects of the present invention is configured such that the pressed portions of the right crank or crank are spaced from one another along a circumferential direction and alternating pressed portions have different axial lengths. With this bicycle crank assembly, the crimping can be accomplished with a smaller force because the surface area of the pressed portion is smaller.

In accordance with a seventeenth aspect of the present invention, the bicycle crank assembly of any one of the first through fourth aspects of the present invention and any one of the sixth through fifteenth aspects of the present invention is configured such that a left crank is mounted in a non-rotatable manner to the left end of the first portion such that its crank arm part is rotationally 180 degrees out of phase with respect to the crank arm part of the right crank. With this bicycle crank arm assembly, a left crank can be mounted to the first portion of a crank shaft on whose second portion a right crank has been crimp-fastened and the left crank can be mounted such that it is 180 degrees out of phase with respect to the right crank.

With the present invention, when the right crank is crimp-fastened to the crank shaft, the second portion of the crank shaft is installed into the engagement bore such that a gap can be formed between the first portion and the engagement bore and then the periphery of the engagement bore is pressed toward the outside in the axial direction of the crank shaft such that the pressed portion bulges radially inward, thus crimp-fastening the right crank and forming an annular space between the crank shaft and the engagement bore. By crimp-fastening the right crank to the crank shaft in this manner, radially outward bulging is eliminated and the same external appearance as before crimp-fastening can be maintained. Therefore, the right crank can be crimp-fastened to the crank shaft in such a manner that the external appearance is attractive.

In accordance with another aspect of the present invention, the thickness of the crank can be reduced to obtain a crank having a low profile because the length of the engagement bore of the crank (which is crimp-fastened to the crank shaft) is shorter than the diameter of the second portion of the crank shaft. Consequently, the heel of the rider is less likely to touch against the crank during pedaling and the crank is less likely to become an impediment during pedaling.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
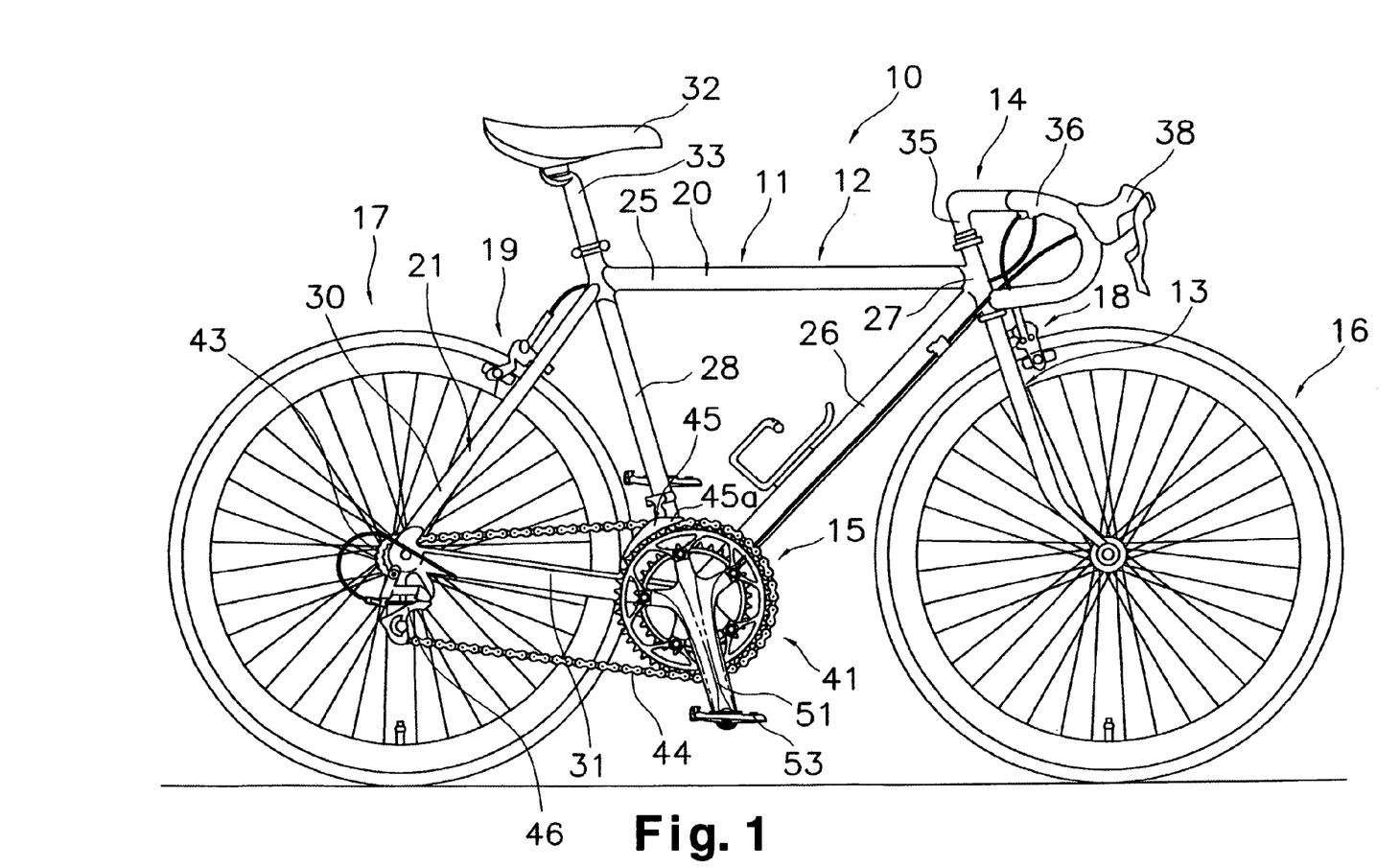
FIG. 1 is a side elevational view of a bicycle with a bicycle crank assembly in accordance with a first embodiment of the present invention.

Referring initially to FIG. 1, a bicycle is illustrated that is constructed in accordance with a first embodiment of the present invention. In this embodiment, the bicycle is a road bike 10 having a drop-type handlebar unit 14. The road bike 10 has a diamond frame 11 that serves as the framework of the bicycle body. The frame 11 has a frame body 12 and a front fork 13 that is supported on a front part of the frame 12 such that it can rotated freely about an axis that is tilted slightly from vertical. The lower part of the front fork 13 is divided into two prongs. The road bike 10 is also provided with a handlebar unit 14 connected to the front fork 13, a drive unit 15 configured to convert pedaling force into driving force, a front wheel 16 supported in a freely rotatable manner on the bottom end of the front fork 13, a rear wheel 17 supported in a freely rotatable manner on a rear part of the frame body 12, and front and rear brake devices 18 and 19.

The frame body 12 has a front triangle 20 and a rear triangle 21 arranged rearward of the front triangle 20. The front triangle 20 is formed by a top tube 25, a down tube 26, a head tube 27, and a seat tube 28. The top tube 25 is arranged generally horizontally. The down tube 26 is arranged below the top tube 25 such that it slants upward toward the front. The head tube 27 is joined to the front ends of the top tube 25 and the down tube 26. The seat tube 28 extends diagonally upward and is joined to the rear ends of the top tube 25 and down tube 26. A seat post 33 having a saddle 32 fastened thereto is secured in the seat tube 28 in such a manner that its position can be adjusted up and down. A cylindrical hanger or bottom bracket shell 29 (FIG. 3) is formed at the portion where the seat tube 28 and the down tube 26 join. The rear triangle 21 is formed by a pair of seat stays 30 and a pair of chain stays 31. The seat stays 30 are joined at their front ends to the seat tube 28 and extend diagonally downward as two separate prongs. The chain stays 31 extend rearward as two separate prongs from the bottom end of the seat tube 28 and are joined at their rear ends to the seat stays 30.

The handlebar stem 35 of the handlebar unit 14 is fastened to the upper part of the front fork 13 in such a manner that it can be moved up and down. A handlebar 36 is fastened to the top end of the handlebar stem 35. The handlebar 36 extends to the left and right and is curved at both ends. Brake levers 38 provided with gear shifting capability are mounted to both ends of the handlebar 36.

The drive unit 15 includes a gear crank unit 41, a small gear unit 43, a chain 44, a front derailleur 45, and a rear derailleur 46. The gear crank unit 41 is provided on the hanger 29 as discussed below. The small gear unit 43 is mounted in a non-rotatable manner to the free hub of the rear wheel. The chain 44 is arranged on the gear crank unit 41 and the small gear unit 43 so as to extend therebetween. The front derailleur 45 and the rear derailleur 46 are configured and arranged in a conventional manner to functioning as means of changing gears. The front derailleur 45 has a chain guide 45a through which the chain 44 passes.

Figure 2:
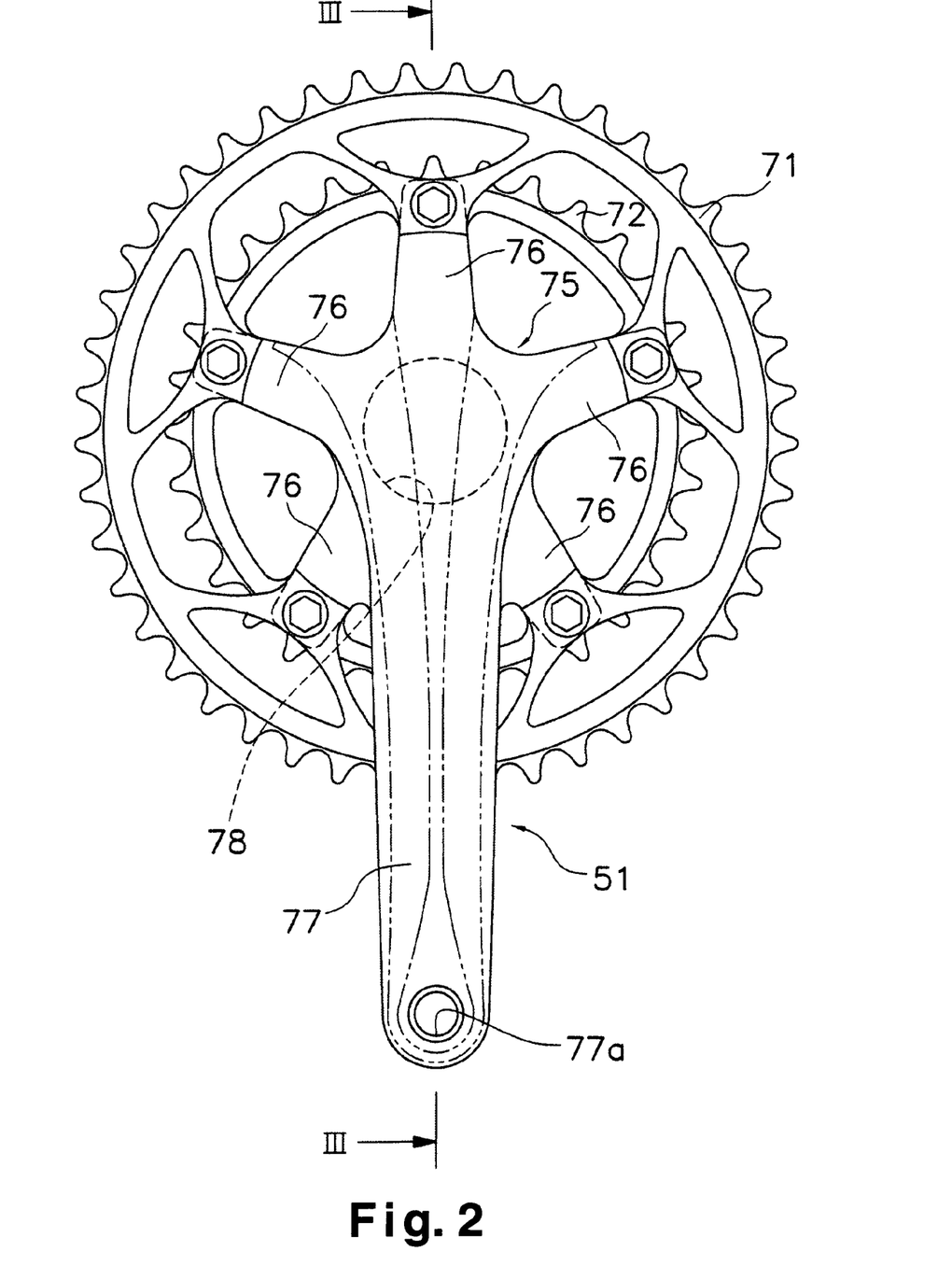
FIG. 2 is a side elevational view of the bicycle crank assembly in accordance with the first embodiment of the present invention.
Figure 3:
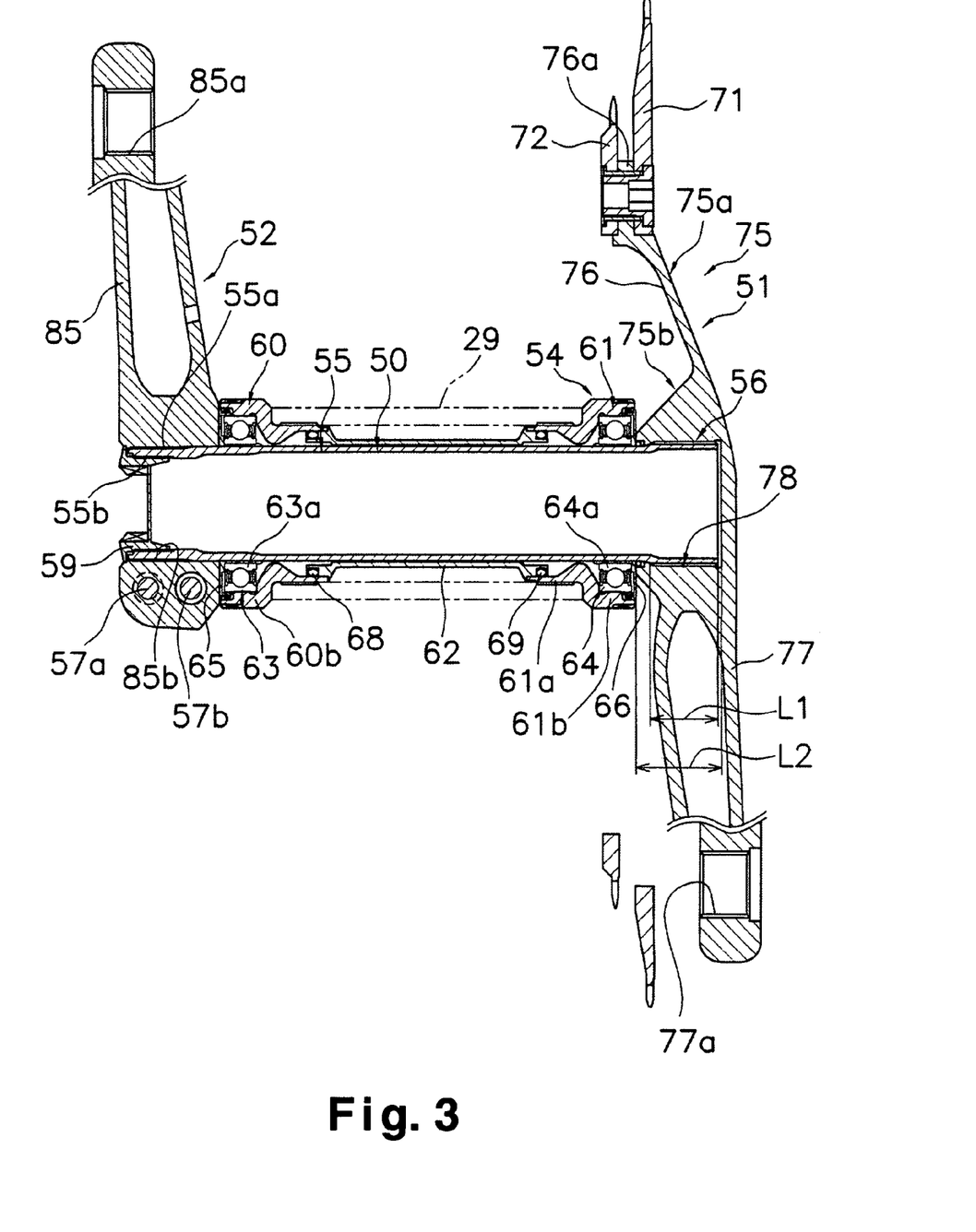
FIG. 3 is a cross sectional view of the bicycle crank assembly taken along line III-III of FIG. 2.

As shown in FIGS. 1 to 3, the gear crank unit 41 includes a crank shaft 50 (FIG. 3), a right crank 51, a left crank 52 (FIG. 3) and a pair of pedals 53 (FIG. 1) mounted to the free ends of the right and left cranks 51 and 52. The crank shaft 50 (FIG. 3) is supported in a freely rotatable manner in the hanger 29 of the frame 11. The right crank 51 is crimp-fastened to the right end of the crank shaft 50. The left crank 52 (FIG. 3) is fastened in a detachable manner to the left end of the crank shaft 50.

As shown in FIG. 3, the crank shaft 50 is mounted in a freely rotatable manner in the hanger 29 by means of a bottom bracket 54 mounted in the hanger 29. The crank shaft 50 is a hollow pipe-shaped member made of a high-rigidity alloy, such as chromium-molybdenum steel. The crank shaft 50 has a first portion 55 and a second portion 56. The first portion 55 is disposed within the hanger 29 and extends from the left end of the hanger 29 to the right end of the hanger 29. The second portion 56 is positioned on the right side of the first portion 55 and has a larger diameter than the first portion 55. The left end part of the first portion 55 has a slightly smaller diameter than the other portions and the radially outward-facing surface of the left end part of the first portion 55 is provided with a left external serrated part 55a for mounting the left crank 52 in a non-rotatable manner at a prescribed rotational angle relative to the crank shaft 50.

Figure 4:
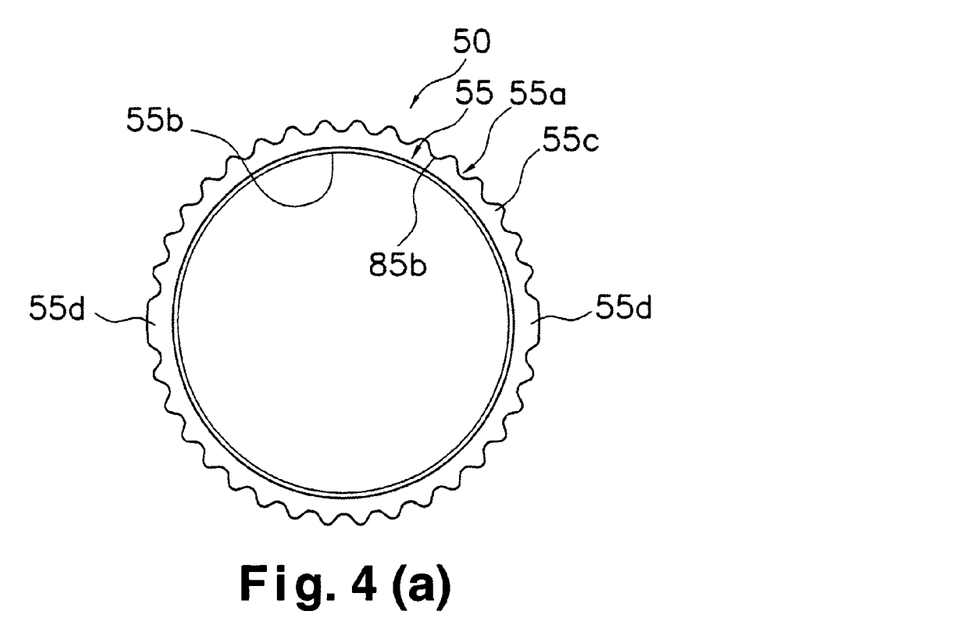
FIG. 4(a) is a diagrammatic left end view of the crank shaft of the bicycle crank assembly in accordance with the first embodiment of the present invention.
FIG. 4(b) is a diagrammatic right end view of the crank shaft of the bicycle crank assembly in accordance with the first embodiment of the present invention.

As shown in FIG. 4(a), the left external serrated part 55a has multiple undulations 55c formed so as to be spaced apart from one another in a circumferential direction. The pitch of the undulations 55c is the same except for two diametrically opposite locations where positioning undulations 55d are provided. The two positioning undulations 55d, which have a different spacing and are located on a line that includes a diameter of the crank shaft, cause the left crank 52 to be mounted at a prescribed rotational angle relative to the crank shaft 50. The radially inward-facing surface of the crank shaft is provided with internal threads 55b so that the left crank 52 can be fastened to the left external serrated part 55a with a bolt 59. A slit (not shown in the figures) is provided in the portion of the left crank 52 where it mounts to the crank shaft 50. The left crank 52 is fastened securely to the crank 50 by tightening the two mounting bolts 57a and 57b (located below the crank shaft 50 in FIG. 3) so as to narrow the slit. The two mounting bolts 57a and 57b are, for example, hexagonal socket head bolts and are inserted from opposite directions such that the bolt heads are on opposite sides of the left crank. The right end face of the first portion 55 has a tapered part 55e that gradually increases in diameter until it joins the second portion 56.

Figure 5:
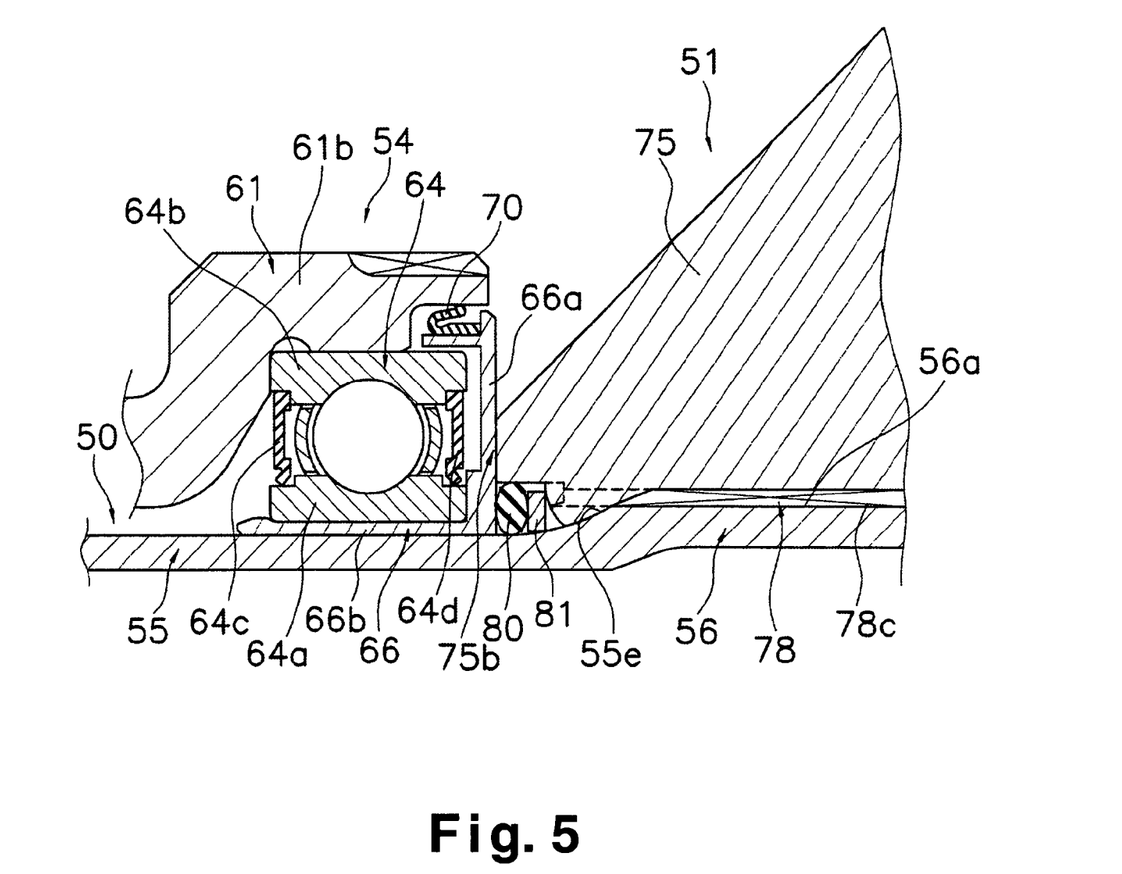
FIG. 5 is an enlarged partial cross sectional view of the crimped portion of the right crank and a portion of the crank shaft of the bicycle crank assembly in accordance with the first embodiment of the present invention.

As shown in FIG. 5, the second portion 56 is cylindrical and extends rightward from the end of the tapered part 55e. A right external serrated part 56a is formed in the radially outward-facing surface of the second part 56 so that the right crank 51 can be mounted at a rotational angle 180 degrees out of phase with respect to the left crank 52. As shown in FIG. 4(b), the right external serrated part 56a has multiple undulations 56c such as axially extending splines formed so as to be equally spaced apart from one another in a circumferential direction. The pitch of the undulations 56c is the same except for two diametrically opposite locations where positioning undulations 56d are provided. The two positioning undulations 56d, which have a different spacing and are located on a line that includes a diameter of the crank shaft, cause the right crank 51 to be mounted at a prescribed rotational angle relative to the crank shaft 50. As a result, the right crank 51 and the left crank 52 are mounted to the ends of the crank shaft 50 such that the right crank 51 and the left crank 52 are rotationally 180 degrees out of phase with each other.

As shown in FIGS. 3 and 5, the bottom bracket 54 includes left and right bearing housings 60 and 61, a cylindrical linking member 62, left and right ball bearings 63 and 64, and left and right cover members 65 and 66. The left and right bearing housings 60 and 61 are screwed into the ends of the hanger 29. The cylindrical linking member 62 is concentric with and links to the left and right bearing housings 60 and 61. The left and right ball bearings 63 and 64 are mounted in the left and right housings 60 and 61. The left and right cover members 65 and 66 are mounted between the crank shaft 50 and the inner rings 63a and 64a of the left and right ball bearings 63 and 64.

The bearing housing 60 is a multiple-diameter cylindrical member having small diameter part 60a and a larger diameter part 60b. The bearing housing 61 is also a multiple-diameter cylindrical member having small diameter part 61a and a larger diameter part 61b. The small diameter parts 60a and 61a screw into the radially inward-facing surface of the hanger 29, while the larger diameter parts 60b and 61b are located to the outside of the small diameter parts 60a and 61a, respectively, in the axial direction. The large diameter parts 60b and 61b are arranged such that they contact the respective end faces of the hanger 29. The ball bearings 63 and 64 are mounted on the radially inward-facing surfaces of the large diameter parts 60b and 61b.

The linking member 62 is a cylindrical member formed such that the external diameters of both ends are larger than the diameter of the rest of the member. The larger-diameter ends are press-fitted to the inside of the small diameter parts 60a and 61a of the bearing housings 60 and 61. An O-ring 68 or 69 is installed into each press-fitted portion.

As shown in FIG. 5, the ball bearing 64 is a sealed bearing having seals 64c and 64d installed between the inner ring 64a and the outer ring 64b and injected with grease in advance. Consequently, lubrication maintenance is eliminated. The bearing 63 has is a sealed bearing having the same structure as the ball bearings 64.

As shown on the right side of FIG. 5, the cover member 66 is made of synthetic resin and includes a circular disc-shaped cover part 66a that covers the axially outward portion of the bearing 64 and a cylindrical mounting part 66b that is arranged between the crank shaft 50 and the inner ring 64a of the bearing 64. A seal ring 70 that seals the gap between the large-diameter part of the bearing housing 61 and the cover member is installed on the inside wall face of a radially outer portion of the cover part 66a. The cover member 65 is made of synthetic resin and has the same structure as the cover member 66.

Arranging the bearings 63 and 64 at the two axially-facing ends of the hanger 29 enables the diameter of the crank shaft 50 to be increased and, as a result, the crank shaft 50 can be made lighter in weight while maintaining high strength and rigidity by making the crank shaft 50 hollow.

As shown in FIGS. 2, 3, and 5, the right crank 51 includes a sprocket mounting part 75 having five arm parts 76 on the tip ends of which two sprockets 71, 72 (one large and one small) can be mounted, a right crank arm part 77, and a crank shaft engagement bore 78 that is a blind bore with a generally a circular shape.

The tip ends of the arm parts 76 are provided with mounting parts 76a for attaching the sprockets 71 and 72. The mounting parts 76a are offset relative to the other portions. As shown in FIG. 3, the sprockets 71 and 72 are mounted on both sides of the mounting parts 76a in such a manner that the sprockets are concentric with respect to the crank shaft 50.

As shown in FIG. 3, the right crank arm part 77 has a hollow structure that is formed integrally with the sprocket mounting part 75. The right crank arm part 77 extends radially outward while slanting slightly outward in the axial direction from the outside surface 75a of the sprocket mounting part 75 to the tip end thereof. In this extended tip end of the right crank arm part 77 is provided a threaded pedal mounting hole 77a into which the pedal 53 is installed.

As shown in FIG. 3, the second portion 56 of the crank shaft 50 is mounted in the crank shaft engagement bore 78 of the right crank 51. The engagement bore 78 of the right crank 51 has a second length or depth L2 that is larger than the first length or depth L1 of the second portion 56 of the crank shaft 50. Thus, the engagement bore 78 of the right crank 51 reaches almost to the outside surface 75a of the sprocket mounting part 75. As a result, the outside surface 75a of the sprocket mounting part 75, which includes the right crank arm 77, is smoothly curved and free of irregularities. The second length L2 of the engagement bore 78 is also shorter than the diameter of the second portion 56 of the crank shaft 50.

Figures 6A, 6B:
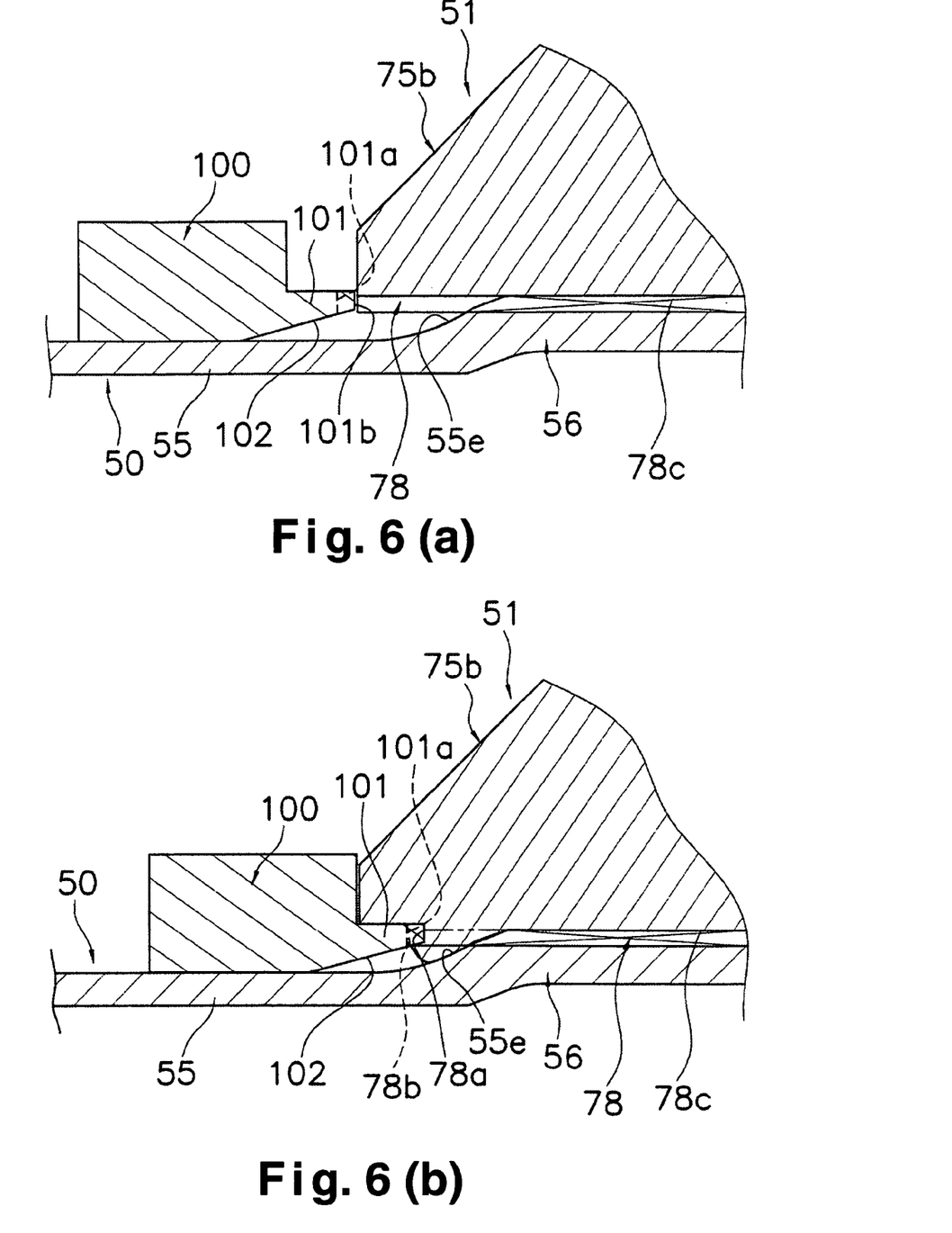
FIG. 6(a) is an enlarged partial cross sectional view of a crimping tooling positioned to perform a crimping process on a portion of the right crank to secure the right crank to the crank shaft of the bicycle crank assembly in accordance with the first embodiment of the present invention.
FIG. 6(b) is an enlarged partial cross sectional view that is similar to FIG. 6(a) of the crimping tooling performing the crimping process on a portion of the right crank so as to secure the right crank to the crank shaft of the bicycle crank assembly in accordance with the first embodiment of the present invention with a crimping tooling positioned to perform the crimping process.

As shown in FIG. 6(a), an annular gap is formed between the engagement bore 78 and the radially outward-facing surface of the right end of the first portion 55 of the crank shaft 50 when the second portion 56 is inserted into the engagement bore 78 before crimping. The radially inward facing surface of the engagement bore 78 is provided with a right internal serrated part 78c such as axially extending splines with multiple undulations that are equally spaced apart from one another in a circumferential direction such a manner that they mesh with the undulations or splines of the right external serrated part 56a. As shown in FIG. 6, with the serrated parts 56a and 78c meshed together, the right crank arm part 77 is crimp-fastened to the crank shaft 50 by mounting a crimping tool 100 to the radially outward-facing surface of the crank shaft 50 and pressing it against the periphery of the engagement bore 78 using an appropriate pressing device.

Figure 7:
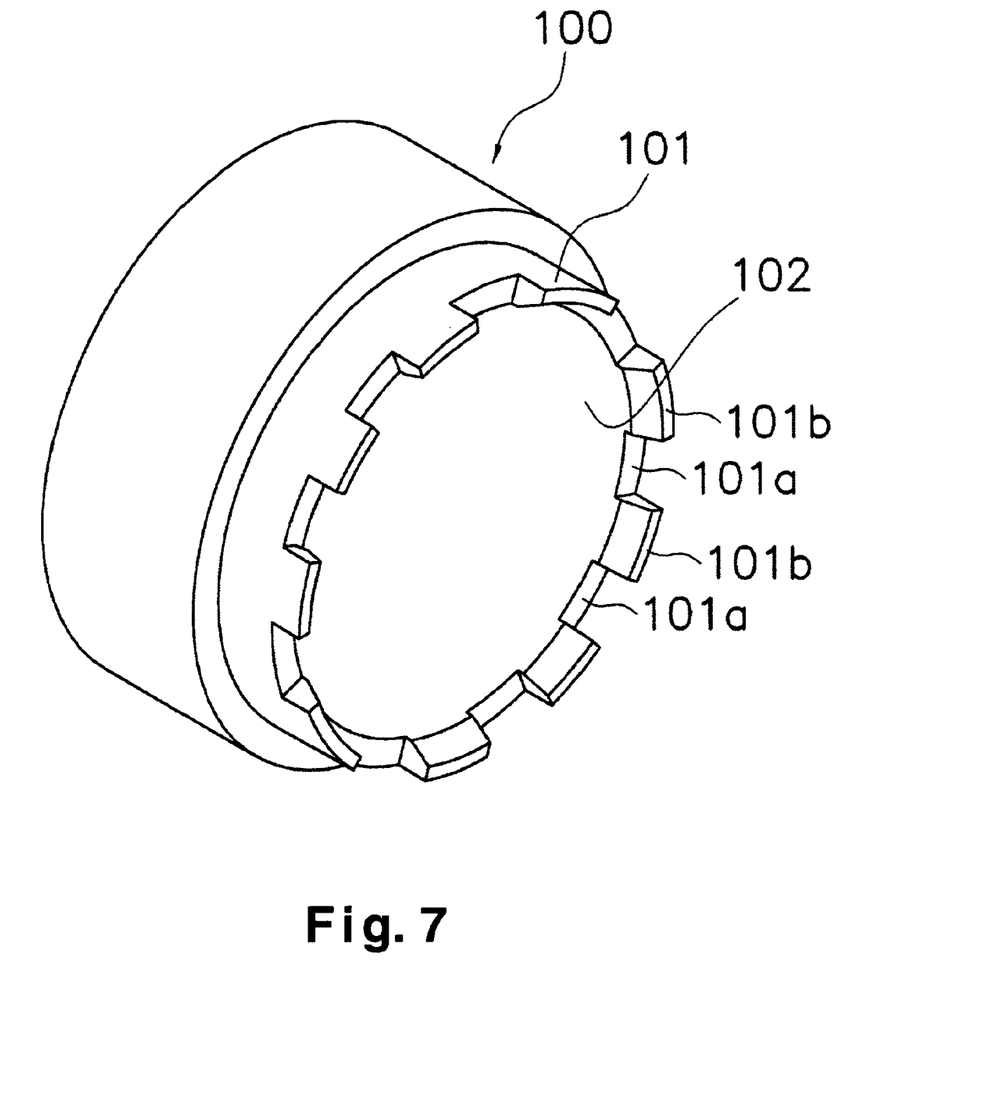
FIG. 7 is an enlarged perspective view of the crimping tool used in FIGS. 6(a) and 6(b) in accordance with the first embodiment of the present invention.

As shown in FIGS. 6 and 7, the crimping tool 100 is a cylindrical member that can be mounted on the outside of the first portion 55 of the crank shaft 50 and its tip end is provided with a smaller-diameter pressing part 101. (The radially inward-facing surface of the pressing part 101 is a tapered part 102 that tapers to a larger diameter as it approaches the tip end. The tip end of the pressing part 101 has a plurality of notches 101a and a plurality of protruding tips 101b that alternate relative to each other. Thus, the notches 101a are formed so as to be separated from one another along a circumferential direction. As a result, when the crimping tool 100 is pressed against the periphery of the engagement bore 78, an annular space of gap is formed with first and second alternating spaces 78a and 78b at the pressed portion such that they are spaced from one another along a circumferential direction. The first and second alternating spaces 78a and 78b have different axial lengths. The first alternating spaces 78a are formed by the protruding tips 101b of the pressing part 101 of the crimping tool 100 and the second alternating spaces 78b are formed by the front edges of the notches 101a. The end faces of these alternating spaces 78a and 78b are depressed toward the outside surface 75a from the portion of the inside surface 75b of the sprocket mounting part 75 that surrounds the engagement bore 78. Thus, by forming notches 101a in the tip end of the crimping tool 100, the surface area of the pressed portion can be reduced and crimping can be accomplished with a smaller force.

When the periphery of the engaging depression 78 is pressed, the portions pressed by the protruding tips 101b of the pressing part 101 are plastically deformed so as to bulge radially inward and contact the tapered part 55e, which constitutes the border portion between the first portion 55 and the second portion 56. As a result, the right crank 51 is crimp-fastened to the crank shaft 50. As described previously, this crimping process forms first and second alternating spaces 78a and 78b. An O-ring 80 that seals the annular gap between the radially inward-facing surfaces of the second alternating spaces 78b and the radially outward-facing surface of the first portion 55 is installed into the second alternating spaces 78b. A washer-shaped backup ring 81 is installed on the side of the O-ring 80 that faces the first alternating spaces 78a. Meanwhile, the axially inward-facing side of the O-ring 80 contacts the outside surface of the cover part 66a of the cover member 66. As a result, the annular gap between the crank shaft 50 and the cover part 66a and the annular gap between the engagement bore 78 and the crank shaft 50 can both be sealed simultaneously.

As shown in FIG. 3, the left crank 52 has a hollow-structured left crank arm part 85 whose tip end has a threaded pedal mounting hole 85a into which the pedal 53 is installed. The base end of the left crank arm part 85 is provided with a left internal serrated part 85b that meshes with the left external serrated part 55a.

When the gear crank unit 41 is mounted to the bottom bracket 54, the second portion 56 of the crank shaft 50 is inserted into the engagement bore 78 of the right crank 51 with the serrated parts 56a and 78c aligned with each other. Then the crimping tool 100 is passed over the first portion 55 of the crank shaft 50 with the pressing part 101 facing toward the right crank 51. With the crimping tool 100 attached to the crank shaft 50, the right crank 51 is, for example, mounted to a holding tool whose shape is matched to the shape of the outside surface of the sprocket mounting part 75 and the right crank arm part 77 of the right crank 51 and the crimping tool 100 is pressed with a pressing device. When the crimping tool 100 is pressed, the portions pressed by the protruding tips 101b of the pressing part 101 are plastically deformed so as to bulge radially inward and contact the tapered part 55e, which constitutes the border portion between the first portion 55 and the second portion 56. As a result, the right crank 51 is crimp-fastened to the crank shaft 50.

With the right crank 51 thus crimp-fastened thereto, the crank shaft 50 is inserted from the right side into the bottom bracket 54 installed in the hanger 29 of the frame 11. Then, the left crank 52 is mounted to the tip end of the first portion 55. By aligning the positioning undulations 55d, the left crank 52 is mounted such that it is rotationally 180 degrees out of phase with respect to the right crank 51. The axial play of the crank shaft 50 is then adjusted by tightening the bolt 59, and, finally, the two mounting bolts of the left crank 52 are installed to complete the installation of the gear crank unit 41.

When the right crank 51 of this crank assembly is crimp-fastened to the crank shaft, the second portion 56 of the crank shaft 50 is installed into the engagement bore 78 such that a gap can be formed between the first portion 55 and the engagement bore 78. Then the periphery of the engagement bore 78 is pressed toward the outside in the axial direction such that the pressed portion bulges radially inward, thus crimp-fastening the right crank 51 and forming an annular space between the crank shaft 50 and the engaging depression 78. Thus, radially outward bulging is eliminated and the same external appearance as before crimp-fastening can be maintained. Therefore, the right crank 51 can be crimp-fastened to the crank shaft 50 in such a manner that its external appearance is attractive.

Also, the thickness of the right crank 51 (which is crimp-fastened to the crank shaft 50) can be reduced to obtain a low-profile right crank 51 because the length of the engagement bore 78 of the right crank 51 is shorter than the diameter of the second portion 56 of the crank shaft 50. Consequently, the heel of the rider is less likely to touch against the right crank 51 during pedaling and the crank is less likely to become an impediment during pedaling.

OTHER EMBODIMENTS

Figure 8:
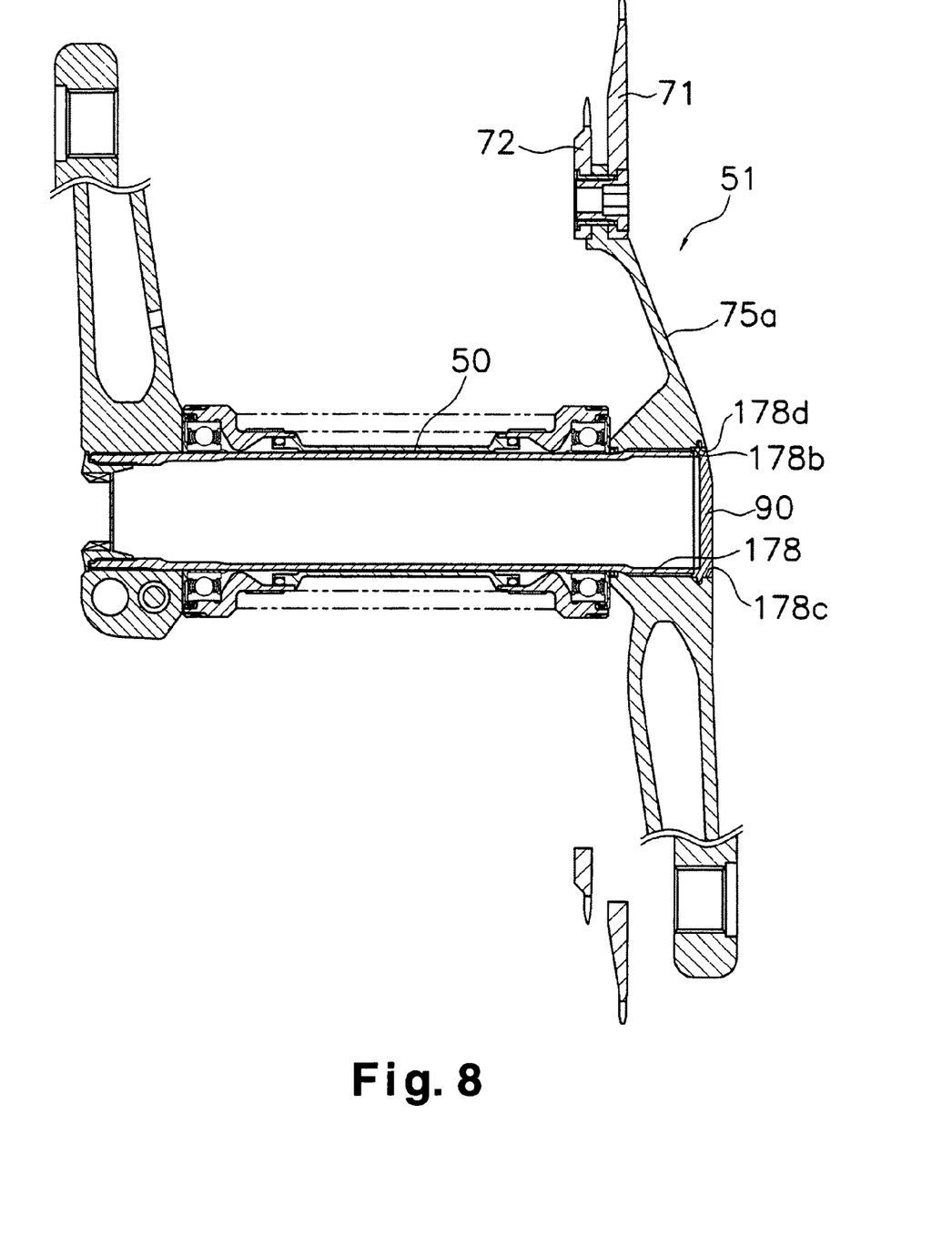
FIG. 8 is a cross sectional view of a bicycle crank assembly, corresponding to FIG. 3, of another embodiment of the present invention.

Although in the previous embodiment the engagement bore 78 stopped short of the outside surface 75a, it is also acceptable to provide an engagement bore 178 that penetrates the outside surface 75a. The opening 178b resulting from the penetration is covered with lid member 90. The lid member 90 interlocks elastically with an annular groove 178d formed in the radially inward-facing surface 178c of the opening 178b.

Figure 9:
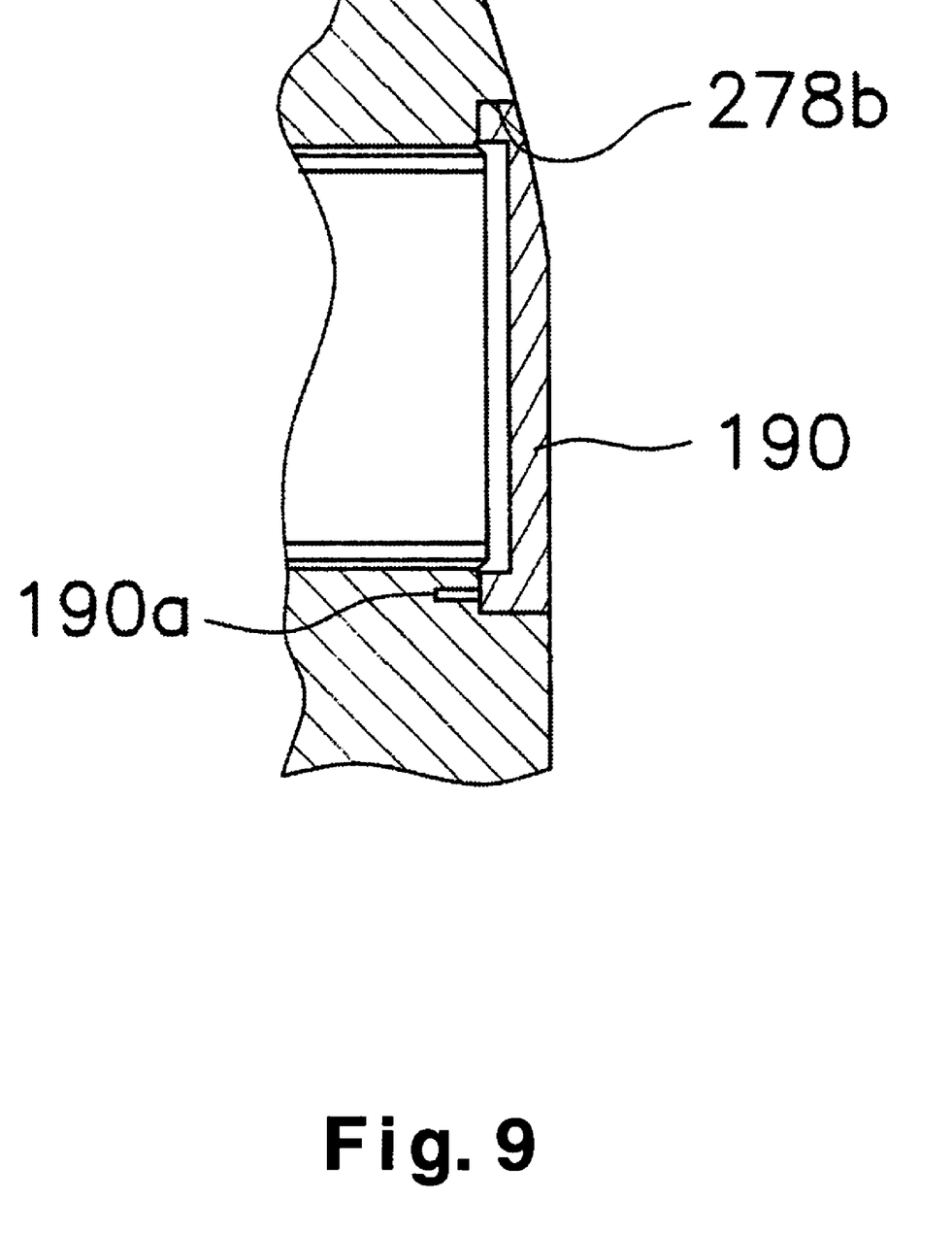
FIG. 9 is an enlarged partial cross sectional view of another embodiment of the lid member mounting structure in accordance with the present invention.

Moreover, the method of securing the lid member 90 is not limited to elastic interlocking with an annular groove 178d. For example, as shown in FIG. 9, the lid member 190 can be fastened to the periphery of the opening 278b with an adhesive. In such a case, a positioning pin 190a is provided on the lid member 190.

Figure 10:
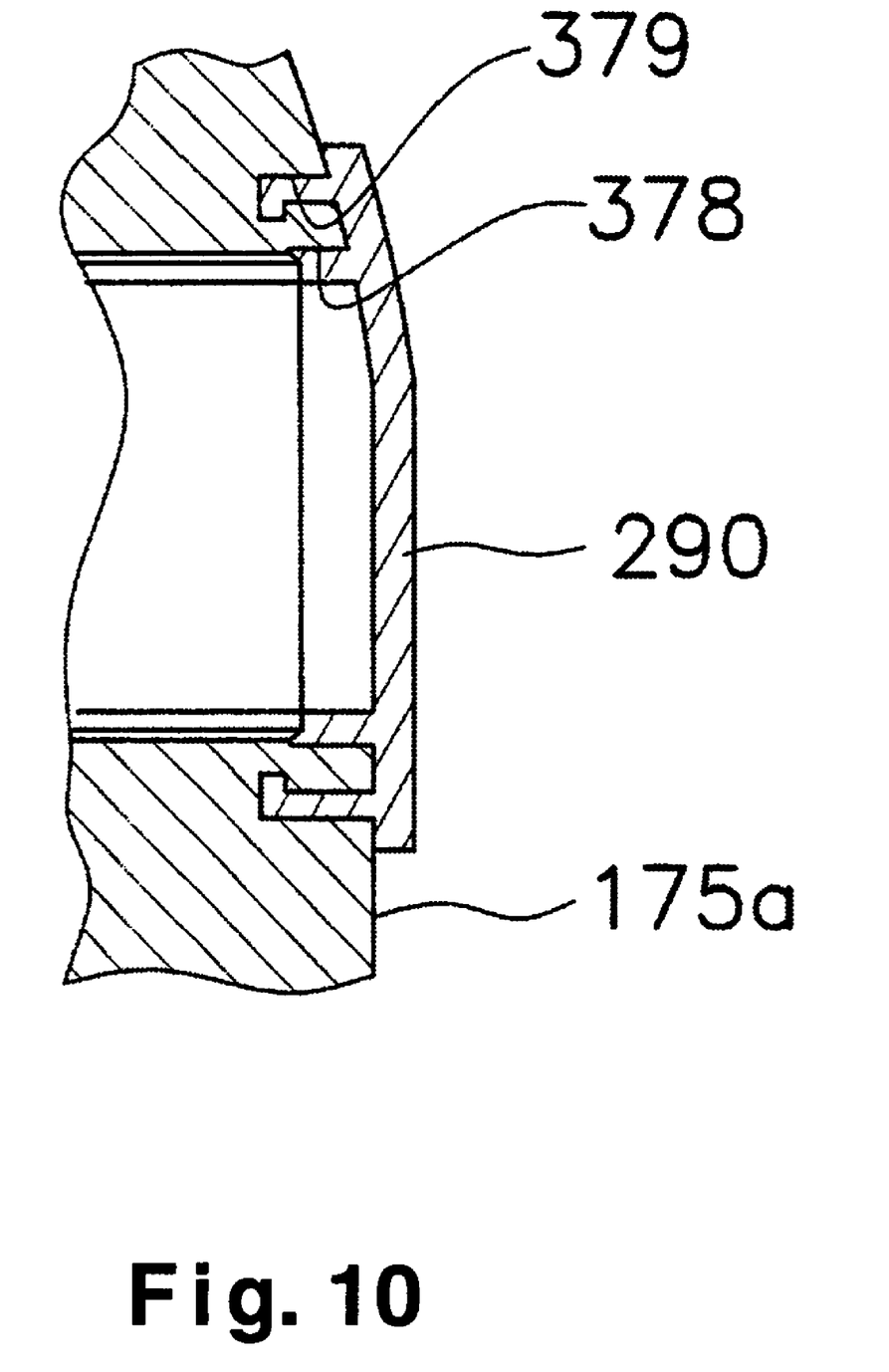
FIG. 10 is a cross sectional view of another embodiment of the lid member mounting structure in accordance with the present invention.

It is also acceptable to, as shown in FIG. 10, provide an annular groove 379 in the outside surface 175a around the outside of the opening 378 and elastically interlock the lid member 290 with the annular groove 379.

Figure 11:
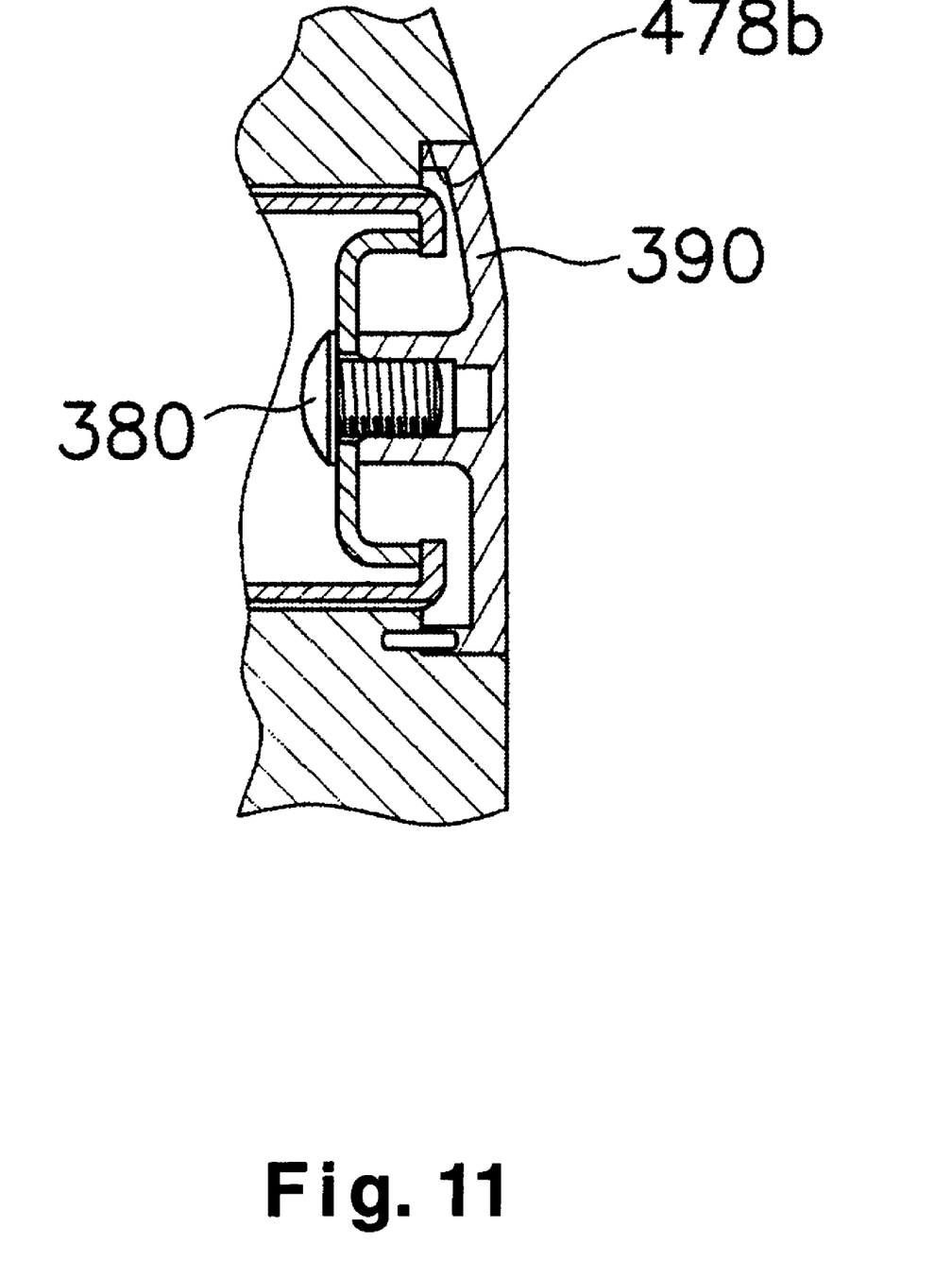
FIG. 11 is a cross sectional view of another embodiment of the lid member mounting structure in accordance with the present invention.

As shown in FIG. 11, it is also acceptable to mount the lid member 390 to the opening 478b with a bolt 380 and a cylindrical washer member 390 [sic] installed from the first-portion side.

Although the previous embodiment concerned a crank assembly for a road bike, the present invention can be applied to any bicycle.

(c) Although in the previous embodiment the crank shaft 50 is a cylindrical shaft that is hollow across its entire length, it is acceptable if the entire crank shaft is not hollow so long as the portion where the right crank is mounted is hollow.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

In construing the present invention, the terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2003-040233. The entire disclosure of Japanese Patent Application No. 2003-040233 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle crank assembly comprising:
   a crank shaft including first and second portions with the second portion being positioned on a right side of the first portion and having a larger diameter than the first portion; and
   a right crank including a sprocket mounting part including a plurality of arm parts configured and arranged to support at least one sprocket, a crank arm part formed integrally with the sprocket mounting part and extending in a radial direction from a first surface of the sprocket mounting part, and a crank shaft engagement bore formed in a center of a second surface located on an opposite side of the sprocket mounting part as the first surface, the right crank being crimp-fastened to the crank shaft by installing the second portion of the crank shaft into the engagement bore such that a gap is formed between the first portion and the engagement bore, and pressing the periphery of the engagement bore from the second surface toward the first surface in the axial direction of the crank shaft such that a pressed portion bulges radially inward and an annular space is formed between the crank shaft and the engagement bore.

2. The bicycle crank assembly as recited in claim 1, wherein the annular space defines an end face that is recessed from the second surface toward the first surface.

3. The bicycle crank assembly as recited in claim 1, further comprising
a seal member disposed between a radially inward-facing surface of the annular space and a radially outward-facing surface of the first portion.

4. The bicycle crank assembly as recited in claim 1, wherein the engagement bore has an axial length that is shorter than the diameter of the second portion.

5. The bicycle crank assembly as recited in claim 1, wherein the engagement bore is a blind bore. portion.

6. A bicycle crank assembly comprising:
a crank shaft including first and second portions with the second portion being positioned closely adjacent to the first portion and having a larger diameter than the first portion; and
a crank having a pedal mounting part provided on a tip end thereof and an engagement bore formed in a base end thereof, the engagement bore having the second portion received therein with the base end having a deformed pressed portion that is crimp-fastened to the second portion of the crank shaft, the engagement bore having a maximum axial length that is shorter than a maximum diameter of the second portion of the crank shaft.

7. The bicycle crank assembly as recited in claim 6, wherein
the crank is a right crank provided with a sprocket mounting part having a plurality of arms configured to support one or more sprockets, and a crank arm part formed integrally with the sprocket mounting part and extending in a radial direction from a first surface of the sprocket mounting part; and
the engagement bore is formed in a center of a second surface located on an opposite side of the sproket mounting part as the first surface.

8. The bicycle crank assembly as recited in claim 7, wherein
a left crank is mounted in a non-rotatable manner to a left end of the first portion such that it is rotationally 180 degrees out of phase with respect to the crank arm part of the crank. side of the sprocket mounting part as the first surface.

9. The bicycle crank assembly as recited in claim 6, wherein
the crank is crimp-fastened by installing the second portion of the crank shaft into the engagement bore such that a gap is formed between the first portion and the engagement bore, and pressing a periphery of the engagement bore outwardly in the axial direction of the crank shaft such that the deformed pressed portion bulges radially inward.

10. The bicycle crank assembly as recited in claim 6, wherein
the crank shaft includes a hollow portion located where the right crank is mounted thereto, the crank shaft is configured and arranged to be supported in a freely rotatable manner at both axially-facing ends of a hanger by bearing assemblies installed in the hanger.

11. The bicycle crank assembly as recited in claim 10, wherein the hollow portion of the crank shaft extends an entire length of the crank shaft.

12. The bicycle crank assembly as recited in claim 6, wherein
a radially outward-facing surface of the second portion has a plurality of first undulations that are spaced in a circumferential direction of the crank shaft; and
the engagement bore has a plurality of second undulations that are spaced in a circumferential direction of the engagement bore, the first and second undulations being meshing together in such a manner that the crank cannot rotate relative to the crank shaft.

13. The bicycle crank assembly as recited in claim 12, wherein
the first undulations and second undulations each include positioning undulations in two different circumferential spaced locations.

14. The bicycle crank assembly as recited in claim 6, wherein
the second portion of the crank shaft has a first length in the axial direction; and
the engagement bore has a second length that is longer than the first length and extends almost through the base end.

15. The bicycle crank assembly as recited in claim 14, wherein
the engagement bore is a blind bore.

16. The bicycle crank assembly as recited in claim 6, wherein
the second portion of the crank shaft has a first length in the axial direction; and
the engagement bore has a second length that is longer than the first length and passes through the base end.

17. The bicycle crank assembly as recited in claim 16, wherein
the crank includes a lid member covering an open end of the engagement bore.

18. The bicycle crank assembly as recited in claim 6, wherein
the deformed pressed portion of the crank includes first and second alternating spaces that alternate relative to one another in a circumferential direction to form alternating pressed portions that have different axial lengths.

19. A bicycle crank assembly comprising:
a crank shaft including first and second portions with the second portion being positioned on a right side of the first portion and having a larger diameter than the first portion; and
a right crank including a sprocket mounting part with a plurality of arm parts configured and arranged to support at least one sprocket, a crank arm part extending in a radial direction from the sprocket mounting part, the sprocket mounting part having a crank shaft engagement bore formed therein, the second portion of the crank shaft being crimp-fastened in the engagement bore by a deformed pressing portion of the sprocket mounting part that bulges radially inward of the larger diameter of the second portion with an annular recess being disposed in the sprocket mounting part radially between the first portion and the engagement bore of the sprocket mounting part.

20. The bicycle crank assembly as recited in claim 19, wherein the engagement bore is a blind bore.

* * * * *